Figure 1:
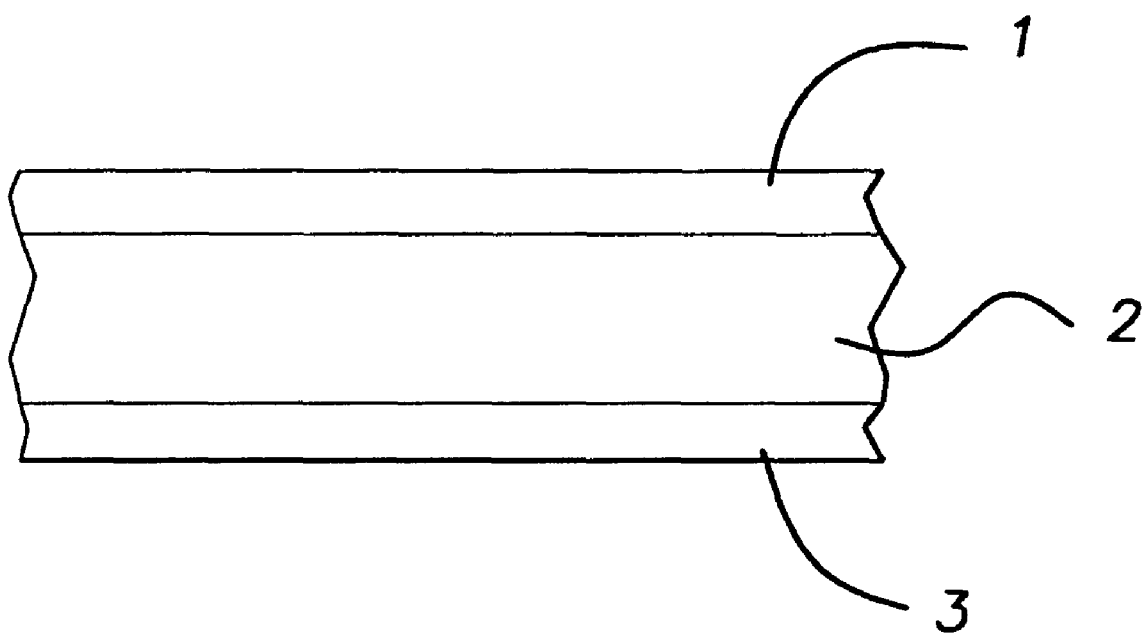

United States Patent [19]
Kok et al.

[11] Patent Number: 6,045,923
[45] Date of Patent: Apr. 4, 2000

[54] CO-EXTRUDED TAPE OR YARN

[75] Inventors: Rudolf Hendrik Kok, Ijsbrechtum; Hendrik Grunstra, Sneek, both of Netherlands

[73] Assignee: Lankhorst Indutech B.V., Sneek, Netherlands

[21] Appl. No.: 08/977,244

[22] Filed: Nov. 24, 1997

[51] Int. Cl.[7] .................................................. B32B 27/08
[52] U.S. Cl. ......................... 428/517; 428/500; 428/515; 428/516
[58] Field of Search ................... 428/500, 515, 428/516, 517

[56] References Cited

U.S. PATENT DOCUMENTS 3,639,573  2/1972  Port .
4,980,227  12/1990  Sekiguchi et al. .

FOREIGN PATENT DOCUMENTS

| | | |
|---|---|---|
| 0262230 | 4/1988 | European Pat. Off. . |
| 0776762 | 6/1997 | European Pat. Off. . |
| 1812700 | 8/1969 | Germany . |
| 1181249 | 2/1970 | United Kingdom . |
| 1387701 | 3/1975 | United Kingdom . |

*Primary Examiner*—Richard Wiesberger
*Attorney, Agent, or Firm*—Pearne, Gordon, McCoy & Granger LLP

[57] ABSTRACT

The invention is directed to a co-extruded tape or yarn of the ABA-type, as well as to a process for producing such a tape, comprising a central layer and two top layers, the composition of the central layer (B) and the top layers (A) being different, wherein the central layer (B) is based on at least one propylene polymer, or on at least one ethylene polymer having a density of more than 935 kg/m$^3$, and the top layers (A) are based on at least one ethylene copolymer with one or more $C_3$–$C_8$ olefins, and the tape or yarn having a thickness of 50 to 150 μm and a stretch ratio between 6 and 10.

11 Claims, 1 Drawing Sheet

CO-EXTRUDED TAPE OR YARN

The present invention is directed to a co-extruded polyolefin tape or yarn of the ABA type, as well as to a process for producing such a tape or yarn. Polyolefin tapes and yarns are known in the art and have especially been used for producing various textile type materials, for example for geotextile, agricultural and other applications, such as protecting cloths.

The polyolefin tapes and fibres are generally prepared by cutting suitable polyolefin films, usually prepared by casting. The tapes may subsequently be fibrillated and twined, resulting in a yarn. The tapes and/or yarns are woven to suitable sizes, depending on the required applications. Examples thereof are bags, but also tarpaulins and the like.

According to European patent application EP-A 366210 a three-ply drawn polyolefin laminate is prepared consisting of a core layer of polypropylene and/or linear low density polyethylene and co-extruded cap layers from butene-1 homo- and copolymers. The laminate has to be drawn to a stretch ratio of 15 to 1, generally resulting in a material having a thickness of about 200 $\mu$m. The material can be used in the packaging area for plastic cans, or for repairing of existing, fractured pipes.

A disadvantage of this system resides therein that the mechanical properties of the material are restricted and that the layers of the laminate easily become detached from each other. Additionally it is noted, that the production is rather slow.

It is an object of the invention to provide a co-extruded tape or yarn, suitable for various purposes, which has properties that are adjustable, not only by the careful selection of polymers to be used, but also by the production conditions. More in particular it is an object to provide a tape or yarn having good, adjustable shrinkage properties, good sealing properties and a superior mechanical strength.

It is a further object to provide a tape or yarn of the ABA-type based on polyolefins, having a superior resistance against delamination of the various layers from each other without the need to use intermediate adhesive layers.

It is also an object of the invention to provide such a tape or yarn that may be recycled in polyolefin fractions, without the need for separation of this material from other polyolefins.

The invention accordingly concerns a co-extruded tape or yarn of the ABA-type, comprising a central layer and two top layers, the composition of the central layer (B) and the top layers (A) being different, wherein the central layer (B) is based on at least one propylene polymer, or on at least one ethylene polymer having a density of more than 935 kg/m$^3$, and the top layers (A) are based on at least one ethylene copolymer with one or more $C_3$–$C_8$ olefins, and the tape or yarn having a thickness of 50 to 150 $\mu$m and a stretch ratio between 6 and 10.

Preferably, the central layer has been prepared from at least one polyolefin selected from the group of polypropylene and polyethylene having a density of more than 935 kg/m$^3$, and blends of these polyolefins. It is to be noted that the polypropylene and polyethylene may contain subordinate amounts of comonomers, which do not materially alter the general product properties, such as ethylene and propylene, respectively.

According to a one embodiment the central layer of the tape according to the invention has been prepared from a blend of polypropylene and one or more polyethylenes, whereby the amount of polypropylene is predominant, i.e. more than 50% by weight. More in particular, the central layer is prepared from a blend of 50 to 90 wt. % of polypropylene and 10 to 50 wt. % of (linear) low density polyethylene (<925 kg/m$^3$), high density polyethylene (>940 kg/m$^3$), very low density polyethylene (<910 kg/m$^3$), or combinations of two or more of these products.

This type of central layer results in a material (tape, yarn or woven material) having adjustable shrinkage properties and superior mechanical strength.

According to another embodiment the central layer of the tape according to the invention has been prepared from a blend of high density polyethylene and one or more other polyolefins, whereby the amount of high density polyethylene is predominant, i.e. more than 50% by weight. More in particular, the central layer is prepared from a blend of 50 to 90 wt. % of high density polyethylene (>940 kg/m$^3$) and 10 to 50 wt. % of (linear) low density polyethylene (<925 kg/m$^3$), very low density polyethylene (<910 kg/m$^3$), or combinations of these products. Additionally an amount of polypropylene may be present to improve the strength of the material. Materials based on high density polyethylene as the main component of the central layer have the advantage of superior abrasion resistance, resistance against delamination (peeling strength) and heat sealability.

It is to be noted that the central layer provides the main strength to the co-extruded tape. Generally, the weight amount of the central layer, based on the total weight of the tape is in excess of 60 wt. %. The amount of central layer may go up to 90 wt. %.

A general lay-out of a coextruded tape or yarn according to the invention has been shown in FIG. 1. In this FIG. 1 denotes the first top layer, 2 denotes the central layer and 3 denotes the second top layer.

The top layers have preferably been prepared from at least one polyolefin, which is compatible with the central layer. The top layers provide at least in part the surface properties, like adhesion, to the material. In general the polyolefins used for the top layers may be selected from the various homo- and copolymers of $\alpha$-olefins. More in particular the layers are prepared from a material selected from the group of high density polyethylene, low density polyethylene, very low density polyethylene and blends of these polyolefins.

The top layers, which preferably amount to 10–40 wt. % of total weight of the tape, are preferably prepared from at least one ethylene copolymer. Preferably a high density polyethylene is added in an amount of 5–45 wt. %

The polyolefin compositions for the production of the central layer and the top layers may contain conventional additives which are used in these materials. More in particular one may use processing aids, UV-stabilizers, conductive compounds, coloring materials, pigments and the like.

An important requirement of the tape according to the invention resides in the stretch ratio or draw ratio which is between 6 and 10. It has been found that the material has optimal properties within these ranges, both in terms of mechanical strengths, for example from 0.25 up to 0.6 GPa or higher, integrity of the material, abrasion resistance, controlled shrinkage and heat sealability.

The tape according to the invention is prepared by co-extrusion of the two polyolefin compositions to produce a three-layer film, using standard equipment and conditions. This co-extrusion can either result in a cast film or a blown film. In the former situation this film may either be uniaxially stretched or unstretched. In the case of blown film this will generally result in biaxially stretched film. The co-extruded tape or yarn does not require the presence of an adhesive layer. It is to be noted that cast extrusion usually results in easier processing and in improved product properties, especially in the case of materials with higher melt index.

After co-extrusion the film is generally cooled, and subsequently cut to produce the co-extruded tape. The said tape is subsequently stretched to the required stretch ratio, followed by a heat treatment of the stretched tape to provide the final, excellent properties.

It is preferred to produce the film by casting, substantially without stretching, which means that the draw-off speed at the die is kept as low as possible.

After cutting the stretching operation is carried out, which is preferably done at a temperature between 110 and 150° C. in a suitable oven, or over heated rollers. Finally, the tape is given a heat treatment, which may also be done in an oven or over heated rollers. The nature and intensity of this heat treatment is very important for determining the final properties of the tape. The temperature at which the heat treatment is given and the processing conditions, roller speed, influence the properties of the final material. It is for example possible to give only a very slight heat treatment, resulting in a minor shrink of only between 0.1 and 4%. In this way the material still has a substantial shrinking capacity. However, it is also possible to give the tape a more severe heat treatment, resulting in a much stronger shrink (up to 20%) or even an equilibrium situation, resulting in a tape or yarn with a much lower shrink capacity. This is especially of advantage when the material has to undergo a further thermal treatment (stabilisation, coating, etc). The temperature of the heat treatment may vary between about 10° C. and 200° C., depending on the required properties of the material.

Optionally, the thus treated tape may be fibrillated and/or twined to produce a yarn, having also the very good properties like the tape.

The tape or yarn of the present invention is subsequently processed to woven material using standard machinery. This woven material may be used for various types of applications, taking into account that mechanical and relaxation properties thereof. Additionally one may give the material, after weaving, a heat treatment to confirm the structure thereof. Suitable applications for these materials are the various types of cloths, such as protecting cloth around buildings or equipment, roof cloths, but also the so-called geo-membranes, geotextiles and filtering cloth. It is also possible to use the material as strapping, especially in view of the excellent sealing properties and resistance against delamination.

The invention is now elucidated on the basis of the following Examples, which are not intended as limiting.

EXAMPLE 1

A weaving yarn is prepared by co-extruding a top layer composition, consisting of a 2/1 (w/w) blend of VLDPE (Enichem, density 900 kg/m$^3$) and HDPE (Hoechst, density 944 kg/m$^3$) and a central layer composition of 60 wt. % high density polyethylene (Hoechst, density 944 kg/m$^3$), 20 wt % of polypropylene (Montell) and 20 wt. % of VLDPE (Enichem, density 900 kg/m$^3$), to produce an ABA type cast laminate (10/80/10 w/w/w). The extrusion temperature was 240° C.

The laminate was immediately cooled to a temperature of about 40° C., cut to tapes of about 1 cm wide, and after heating to a temperature of about 120° C., stretched to a ratio of 7.9. After stretching the material was shortly heated to 115° C. over four rollers, whereby the material shrunk by 7.0%. The thickness of the tape was 80 μm. Subsequently it was fibrillated and twisted to produce a yarn of 2000 denier, suitable for weaving.

The properties of the yarn were as follows:

Tensile strength: 4 g/denier (0.32 GPa)

Shrinkage (110° C.): 20%

The yarn was woven to a filtering cloth, which cloth was heated further to seal and shrink the material, thus producing a filter cloth of regular mesh size.

EXAMPLE 2

A strapping tape is prepared by co-extruding a top layer composition, consisting of a 2/1 (w/w) blend of VLDPE (Enichem, density 900 kg/m$^3$) and HDPE (Hoechst, density 944 kg/m$^3$) and a central layer composition of 70 wt. % of polypropylene (Montell) and 30 wt. % high density polyethylene (Hoechst, density 944 kg/m$^3$), to produce an ABA type cast laminate (10/80/10 w/w/w). The extrusion temperature was 240° C.

The laminate was immediately cooled to a temperature of about 50° C., cut to tapes of about 15 mm wide, and after heating to a temperature of about 130° C., stretched to a ratio of 8.6. After stretching the material was shortly heated to 120° C. over four heated rollers, whereby the material shrunk by 8%. A tape of 5 mm width, 120 μm thickness and 5000 denier was obtained, suitable for use as strapping in packaging.

The properties of the tape were as follows:

Tensile strength: 6 g/denier (0.48 GPa)

Elongation at break: 20%

After heat sealing two ends of the tape to each other the sealing strength was about 50% of the tensile strength.

EXAMPLE 3

A weaving tape is prepared by co-extruding a top layer composition, consisting of a 2/1 (w/w) blend of VLDPE (Enichem, density 900 kg/m$^3$) and HDPE (Hoechst, density 944 kg/m$^3$) and a central layer composition of 53 wt. % high density polyethylene (Hoechst, density 944 kg/m$^3$), 30 wt. % polypropylene (Montell, MFI 1.5 g/10 min) and 17 wt. % VLDPE (Enichem, density 900 kg/m$^3$), to produce an ABA type cast laminate (10/80/10 w/w/w). The extrusion temperature was 240° C.

The laminate was immediately cooled to a temperature of below 40° C., cut to tapes of about 5 mm wide, and after heating to a temperature of about 117° C., stretched to a ratio of 8. After stretching the material was shortly heated to 125° C. over four rollers, whereby the material shrunk by 10%. A tape of 80 μm and 1200 denier was obtained, suitable for use as weaving tape.

The properties of the tape were as follows:

Tensile strength: 5 g/denier (0.40 GPa)

Shrinkage (110° C.): <10%

What is claimed is:

1. Co-extruded tape or yarn of the ABA-type, comprising a central layer and two top layers, the composition of the central layer (B) and the top layers (A) being different, wherein the central layer (B) is based on at least one propylene polymer, or on at least one ethylene polymer having a density of more than 935 kg/m$^3$, and the top layers (A) are based on at least one ethylene copolymer with one or more $C_3$–$C_8$ olefins, further containing 5 to 45 wt. % of high density polyethylene, having a density of more than 940 kg/m$^3$, at least one of the polyolefins in the top layer being compatible with the central layer, and the tape or yarn having a thickness of up to 150 μm and a stretch ratio between 6 and 10.

2. Tape or yarn according to claim 1, wherein the central layer (B) is based on at least one of the blends selected from the group of a—polypropylene and at least one polyethylene having a density of less than 935 kg/m$^3$, b—polyethylene having a density of at least 940 kg/m$^3$, and at least one of polyethylene having a density of less than 935 kg/m$^3$.

3. Tape or yarn according to claim 1, wherein the top layers (A) are prepared from at least one copolymer of ethene and at least one of propene, butene-1, hexene-1, octene-1 and 3-methylpentene-1.

4. Tape or yarn according to claim 1, wherein the central layer has been prepared from a blend of 50 to 90 wt. % of polypropylene and 10 to 50 wt. % of polyethylene, said polyethylene being (linear) low density polyethylene (<925 kg/m$^3$), high density polyethylene (>940 kg/m$^3$), very low density polyethylene (<910 kg/m$^3$) or combinations of two or more thereof.

5. Tape or yarn according to claim 1, wherein the central layer has been prepared from a blend of 50 to 90 wt. % of high density polyethylene (>940 kg/m$^3$) and 10 to 50 wt. % of (linear) low density polyethylene (<925 kg/m$^3$), very low density polyethylene (<910 kg/m$^3$), or combinations of these products.

6. Tape or yarn according to claim 5, wherein additionally an amount of polypropylene is present in the central layer.

7. Tape or yarn according to claim 1, wherein the top layers have been prepared from a blend of at least one high density polyethylene, and at least one low density polyethylene, whereby the melt indexes of the two polyethylene are respectively less than 1 and more than 2.5.

8. Tape or yarn according to claim 1, wherein the central layer is present in the tape in an amount of 60 to 90 wt. %.

9. Use of co-extruded tape or yarn of the ABA-type in geotextiles, geomembranes, protective cloths or filtering cloths, said tape or yarn comprising a central layer and two top layers, the composition of the central layer (B) and the top layers (A) being different, wherein the central layer (B) is based on at least one propylene polymer, or on at least one ethylene polymer having a density of more than 935 kg/m$^3$, and the top layers (A) are based on at least one ethylene copolymer with one or more $C_3$–$C_8$ olefins, further containing 5 to 45 wt. % of high density polyethylene, having a density of more than 940 kg/m$^3$, at least one of the polyolefins in the top layer being compatible with the central layer, and the tape or yarn having a thickness of up to 150 μm and a stretch ratio between 6 and 10.

10. Tape or yarn according to claim 1, wherein said tape or yarn has a thickness of 50 to 150 μm.

11. Use of co-extruded tape or yarn according to claim 9, wherein said tape or yarn has a thickness of 50 to 150 μm.

* * * * *